(12) United States Patent
Figeys et al.

(10) Patent No.: US 10,520,677 B2
(45) Date of Patent: Dec. 31, 2019

(54) INTEGRATED PHOTONIC DEVICE FOR MODULATING THE PHASE OF A LIGHT SIGNAL

(71) Applicant: IMEC VZW, Leuven (BE)

(72) Inventors: Bruno Figeys, Leuven (BE); Veronique Rochus, Leuven (BE); Roelof Jansen, Leuven (BE); Xavier Rottenberg, Leuven (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/231,452

(22) Filed: Dec. 22, 2018

(65) Prior Publication Data

US 2019/0196111 A1 Jun. 27, 2019

(30) Foreign Application Priority Data

Dec. 22, 2017 (EP) .................................. 17210390

(51) Int. Cl.
*G02B 6/35* (2006.01)
*G02B 6/34* (2006.01)
*G02B 6/12* (2006.01)

(52) U.S. Cl.
CPC ....... *G02B 6/3512* (2013.01); *G02B 6/12002* (2013.01); *G02B 6/34* (2013.01); *G02B 6/3518* (2013.01); *G02B 6/3524* (2013.01); *G02B 6/3548* (2013.01); *G02B 6/3596* (2013.01); *G02B 2006/12061* (2013.01); *G02B 2006/12104* (2013.01); *G02B 2006/12107* (2013.01);

(Continued)

(58) Field of Classification Search
None
See application file for complete search history.

(56) References Cited

U.S. PATENT DOCUMENTS

| 4,013,000 A | 3/1977 | Kogelnik |
| 5,969,848 A | 10/1999 | Lee et al. |

(Continued)

FOREIGN PATENT DOCUMENTS

CN 105449511 A 3/2016

OTHER PUBLICATIONS

"Phase shifting techniques," online article. Downloaded from web site http://www.optique-ingenieur.org/en/courses/OPI_ang_M02_C06/co/Contenu_09.html accessed on Jun. 20, 2017.

(Continued)

*Primary Examiner* — Jerry Rahll
(74) *Attorney, Agent, or Firm* — Moser Taboada

(57) ABSTRACT

An integrated photonic device comprises: an input waveguide configured to extend in an input plane, and an output waveguide configured to extend in an output plane, wherein the output plane is parallel to or contained within the input plane; an input coupler optically coupled to the input waveguide, wherein the input coupler is configured to redirect a light signal out of the input waveguide and the input plane; a light property modifier configured to receive the light signal from the input coupler and reflect the light signal towards the output plane, wherein the light property modifier is configured to selectively adjust an optical path length of the light signal; and an output coupler optically coupled to the output waveguide, wherein the output coupler is configured to receive the reflected light signal from the light property modifier and redirect the light signal into the output waveguide and the output plane.

16 Claims, 6 Drawing Sheets

(52) U.S. Cl.
CPC .............. *G02B 2006/12142* (2013.01); *G02B 2006/12147* (2013.01)

(56) References Cited

U.S. PATENT DOCUMENTS

| | | |
|---|---|---|
| 2003/0012509 A1 | 1/2003 | Chang et al. |
| 2004/0184717 A1 | 9/2004 | Koontz et al. |
| 2004/0234201 A1 | 11/2004 | Logvin et al. |
| 2006/0245686 A1 | 11/2006 | Baumann et al. |
| 2007/0160321 A1 | 7/2007 | Wu et al. |

OTHER PUBLICATIONS

Extended European Search Report dated Jun. 6, 2018 for Application No. 17210390.5.

INTEGRATED PHOTONIC DEVICE FOR MODULATING THE PHASE OF A LIGHT SIGNAL

CROSS-REFERENCE TO RELATED APPLICATIONS

This application claims benefit of EPC Application No. 17210390.5, filed on 22 Dec. 2017, which is herein incorporated by reference in its entirety.

TECHNICAL FIELD

The present inventive concept relates to integrated photonic devices.

BACKGROUND

Fabricating photonic devices using complementary metal-oxide-semiconductor (CMOS) compatible processes enables mass production of low cost, compact, integrated solutions. In such processes, silicon is commonly used for e.g. infrared light applications. In particular, for silicon photonics, several types of phase shifters have been developed. However, there is a need to improve photonic devices fabricated by CMOS compatible processes, in particular with respect to surface footprint, operational wavelengths, power consumption, insertion loss, bandwidth, and speed.

SUMMARY

It is an object of the present inventive concept to provide an improvement of photonic devices and enable an increased versatility of photonic devices.

This and other objects of the present inventive concept are at least partly met by the invention as defined in the independent claims. Preferred embodiments are set out in the dependent claims.

According to an aspect, there is provided an integrated photonic device comprising: an input waveguide arrangement comprising an input waveguide configured to extend in an input plane, and an output waveguide arrangement comprising an output waveguide configured to extend in an output plane, wherein the output plane is parallel to or contained within the input plane; an input coupler optically coupled to the input waveguide, wherein the input coupler is configured to redirect a light signal out of the input waveguide and the input plane; a light property modifier configured to receive the light signal from the input coupler and reflect the light signal towards the output plane, wherein the light property modifier is configured to selectively adjust an optical path length of the light signal; and an output coupler optically coupled to the output waveguide, wherein the output coupler is configured to receive the reflected light signal from the light property modifier and redirect the light signal into the output waveguide and the output plane.

In general, the present inventive concept is based on the realization that an integrated phase shifter can be realized by bringing a light signal out of the plane in which it propagates. Thanks to the light signal being output or redirected out of the plane, the device may decouple a photonic structure for guiding light on a substrate from a control structure, which may include mechanical, movable parts and which may be used for adjusting an optical path length. This may imply that light guiding arrangement in the integrated photonic device need not be designed for also including mechanical, movable parts in the same plane, which may reduce complexity of a structure in the plane of a light guiding arrangement. Also, the device may allow large changes to the optical path length to be made while requiring a small active area, such that the device has a compact in-plane footprint.

It should be realized that the light property modifier may not necessarily be configured to adjust only a length of the optical path. On the contrary, the light property modifier may also redirect or re-orient the light signal so as to modify a path taken by the light signal (not only modify the length of the path).

In fact, in an example, the light property modifier need not necessarily change the actual length of the optical path, but may instead only change a direction of the optical path. Thus, the light property modifier may be configured to selectively adjust an optical path of the light signal. This may include adjusting the length of the optical path, but in some examples, it may include selecting which path the light signal is to take. Thus, the light property modifier may be configured to selectively adjust a direction of an optical path of the light signal.

Further, the output or redirection of the light signal out of the plane may allow an optical path length to be adjusted by means of a light property modifier, which needs not be arranged in the plane of the input waveguide. This provides large degrees of freedom in designing the light property modifier as the light property modifier need not be constrained to a plane in which light propagates.

By adjusting an optical path length, an active component for controlling light propagation in the integrated photonic device may be provided. The adjusting of the optical path length may for instance be used for controlling a phase shift of the light signal. Having an active component enables versatile use of photonic devices.

Further, it has been realized that the light signal may be selectively redirected into a selection of waveguides in an integrated photonic device based on controlling an optical path length using the light property modifier. As mentioned above, the selection of waveguides needs not necessarily be made based on controlling a length of the optical path. Rather, it may be contemplated that the light property modifier adjusts a direction of the optical path, such as angle of the optical path for selecting a waveguide that the light signal is to be redirected into. Thus, the integrated photonic device may use adjustment of the optical path length for selecting a path defined by one output waveguide among a plurality of output waveguides, in which path the light signal will be propagated.

Further, the integrated photonic device is compatible with CMOS processes, and provides improved properties with respect to optical loss and surface footprint.

The integrated photonic device may be formed on a semiconductor substrate. In some embodiments, the integrated photonic device may be formed by semiconductor materials on the substrate. However, the integrated photonic device may alternatively be formed in SiN photonics or in other dielectric materials, which may be compatible with CMOS processes, but need not include semiconductor materials.

The photonic device may be integrated based on use of processes for forming patterned layers on top of each other, e.g. on top of a substrate, so that the layers are bonded to each other to form an integrated whole. Such integrated photonic device may be formed using CMOS processes, but it should be realized that similar or other processes may be formed, which may be at least partially not CMOS compatible.

It is to be understood that the input plane and output plane may be one and the same plane. However, the input plane and the output plane need not necessarily be one and the same plane. Also, it should be understood that in an embodiment of the light signal being selectively redirected into a selection of waveguides, the output waveguide arrangement may comprise a plurality of output waveguides which may be configured to extend in different output planes, which may possibly be parallel to each other.

One or more of the input plane and the output plane(s) may be parallel with a substrate of the integrated photonic device.

The input waveguide arrangement, the output waveguide arrangement, and the light property modifier may be integrated on one and the same semiconductor substrate. Hereby, a compact arrangement may be achieved.

Below will follow a few modifications of the integrated photonic device which e.g. may provide a simple arrangement for adjusting the optical path length of the light signal.

The integrated photonic device may comprise a reflector configured to be movable along an axis being substantially perpendicular to the input plane in order to selectively adjust the optical path length of the light signal. The reflector may also be configured to be rotated with respect to the input plane, i.e. to be rotated around a virtual axis parallel to the input plane.

Thus, the light property modifier may achieve adjustment of the optical path length by changing a distance in which light travels by means of moving and/or rotating the reflector.

The reflector may be selected from the group consisting of: metal reflectors, Bragg stack reflectors, flat lenses and high contrast grating reflectors.

The reflector may comprise a structure arranged to converge the reflected light signal onto the output coupler. Such a structure may e.g. be a lens which may or may not be flat or substantially flat. For instance, a lens of Fresnel-lens type or similar may be used. Hereby, coupling between the input coupler and the output coupler may be improved.

The integrated photonic device may further comprise an actuator configured to move the reflector in the direction substantially perpendicular to the input plane. The actuator may also be configured to rotate the reflector with respect to the input plane, i.e. to rotate the reflector around a virtual axis parallel to the input plane.

Thus, the optical path length may be easily controlled by means of controlling the actuator so as to move the reflector in a desired manner.

The actuator may be selected from the group consisting of: capacitive actuators, piezoelectric actuators, magnetic actuators, and thermal actuators.

It should be realized that other types of actuators may also be contemplated. For instance, an optic actuator, even if providing a relatively small force, may possibly be used.

The actuator may be a microelectromechanical system, MEMS, structure configured to be controlled by an applied voltage and to move the light property modifier in the direction substantially perpendicular to the first plane such that linear adjustment of the optical path length of the light signal in response to the applied voltage is achieved. This enables the optical path length to be linearly dependent on an applied voltage, facilitating control of the optical path length.

The MEMS structure may comprise a cantilever and/or a membrane. The reflector may be arranged on the cantilever and/or the membrane.

The light property modifier may comprise a material having a refractive index affectable by an external signal in order to selectively adjust the optical path length of the light signal.

It is to be understood that the light property modifier may comprise a reflector, which may be movable, and a material having a refractive index affectable by an electromagnetic field, as described above, in combination.

The material having a refractive index affectable by an external signal may be liquid crystal, which may be affected by an electromagnetic field. However, it should be realized that other types of materials may be used instead. For instance, a phase change material may be used, wherein a change of state of the phase change material may be triggered e.g. by heating the material. Further, a material which may exhibit an electro-optic Pockels or Kerr effect may be used, wherein the material may change refractive index in dependence of an electric field.

The output waveguide may be a first output waveguide, and the output waveguide arrangement may comprise a second output waveguide optically coupled to a second output coupler configured to receive the reflected light signal from the light property modifier and redirect the light signal into the output waveguide and the output plane, wherein the second waveguide is configured to extend in a second output plane being parallel to or contained within the input plane, and wherein the light property modifier is configured to selectively direct the light signal into at least one of the and second output waveguides via the first and second couplers respectively, based on the selectively adjusted optical path length.

In an arrangement having several output waveguides, it may be possible to selectively direct a light signal into a selection of the several output waveguides by selectively adjusting the optical path length. Such an arrangement may have respective output couplers being separated spatially in a direction being substantially perpendicular to a propagation direction of the light signal in the input waveguide. The path length of the light signal may be selectively adjusted by moving a reflector in a direction substantially perpendicular to the input plane, and/or by rotating the reflector with respect to the input plane, i.e. by rotating the reflector around a virtual axis parallel to the input plane.

Some embodiments of input and output grating couplers will be described in the following paragraphs. However, as is readily understood by the person skilled in the art, a great number of combinations and permutations of different types of input couplers and output couplers is possible within the scope of the inventive concept, and in particular in an integrated photonic device comprising an input waveguide arrangement comprising several input waveguides having corresponding input couplers, and an output waveguide arrangement comprising several output waveguides having corresponding output couplers. For the sake of clarity, only a few of the possible combinations and permutations in an embodiment comprising a single input coupler and a single output coupler will be disclosed. Further, the embodiments are described in the context of a grating coupler. However, as is readily understood by the person skilled in the art, the input and/or output coupler may comprise e.g. a metal reflector behaving similarly to the disclosed grating couplers.

In order to fully appreciate the following disclosure, it may be necessary to describe the characteristics of a backward scattering grating coupler and a forward scattering grating coupler.

A backward scattering grating coupler optically coupled to a waveguide may direct, or receive, a light signal having a vector component opposite of a propagation direction of the light signal in the waveguide to which the backward scattering grating coupler is optically coupled. Similarly, a forward scattering grating coupler optically coupled to a waveguide may direct, or receive, a light signal having a vector component in a propagation direction of the light signal in the waveguide to which the forward scattering grating coupler is optically coupled.

The input coupler may be a backward scattering grating coupler and the output coupler may be a backward scattering grating coupler. Hereby, a compact arrangement may be achieved. Such an arrangement may allow the light signal to be directed essentially "backwards" from the input coupler, opposite its direction of propagation in the input waveguide, and thus the output coupler may be arranged in front of the input coupler with respect to a propagation direction of the light signal in the input waveguide. This may allow a very compact design of the photonic device.

The input coupler may be a backward scattering grating coupler and the output coupler may be a forward scattering grating coupler. Hereby, the light signal may, in the output waveguide optically coupled to the output coupler, propagate in a direction opposite of a propagation direction of the light signal in the input waveguide. In other words, such an arrangement may essentially form a "u-turn" for the light signal.

The input coupler may be a forward scattering grating coupler and the output coupler may be a forward scattering grating coupler.

The input coupler and/or the output coupler may be a sideways scattering grating coupler. It is to be understood that a forward or backward scattering grating coupler as described in the previous paragraphs may also comprise the properties of a sideways scattering grating coupler. Hereby, a light signal may be directed in a direction having a vector component in the input plane and/or output plane being perpendicular to a propagation direction of the light signal in the input waveguide and/or output waveguide. In other words, the input coupler may be arranged to direct the light signal sideways with respect to a propagation direction of the light signal in the input waveguide. Similarly, the output coupler may be arranged to receive the light signal sideways with respect to a propagation direction of the light signal in the output waveguide.

The input coupler and/or the output coupler may be a converging grating coupler. In other words, a collimated light signal passing via the e.g. converging grating input coupler may converge. This may allow the integrated photonic device to be more efficient and reduce losses in the optical path of the light signal.

However, the input coupler and/or the output coupler may alternatively be a diverging grating coupler. In other words, a collimated light signal passing via the e.g. diverging grating input coupler may diverge.

In one embodiment, a first part of the light signal may transmit through the input coupler and continue in the output waveguide. In other words, the input coupler may be configured to allow the first part of the light signal to be transmitted to the output waveguide. A second part of the light signal may be directed via the input coupler to the light property modifier, and subsequently be reflected to the output waveguide via the output coupler. Consequently, the first part of the light signal may interfere with the second part of the light signal. This may form a Mach-Zehnder interferometer for amplitude modulation.

In one embodiment, the input coupler and output coupler may be combined into a single coupler arrangement. The single coupler arrangement may be configured to function similarly to a backward scattering input coupler and a backward scattering output coupler. Hereby, a compact arrangement may be achieved.

The input and output waveguide arrangements may comprise silicon nitride (SiN). The input and output coupler may comprise SiN. In one embodiment, the input and output waveguide arrangements and/or the input and output coupler consist of SiN. The use of SiN in the input and output waveguide arrangements may allow using the photonic device for propagation of visible light. However, it should be realized that other types of materials may be used as well.

Since silicon is not transparent to visible light, photonic devices for use with visible light are not suited to be formed in silicon. Hence, for such applications, SiN is an attractive option as it is transparent to visible light and waveguides in SiN may be patterned on a substrate using CMOS compatible processes.

However, forming active components for controlling light signals in the photonic devices using SiN are not easily achieved. Whereas modulation of a light signal propagating in a silicon waveguide may be achieved in many different ways within the waveguide, such as through charge accumulation modulation, charge depletion modulation and thermo-optic modulation, such options are not readily available for SiN waveguides.

Therefore, the use of a photonic device which is configured to redirect a light signal out of an input plane and which provides a light property modifier for selectively adjusting an optical path length of the light signal before the light signal is coupled into an output plane, may be particularly useful for SiN photonic devices.

In yet another embodiment, the input and output waveguide arrangements and/or the input and output coupler comprise a material being substantially transparent to visible light.

The light signal may comprise visible light.

The light property modifier may be configured to selectively adjust the optical path length of the light signal by at least $\pi$ radians, such as $2\pi$ radians. However, it should be realized that the light property modifier may be configured to adjust the optical path length within other ranges. Thus, in some embodiments, the optical path length may be changed between 0-$\pi$ radians, 0-$2\pi$ radians, or even extending above $2\pi$ radians. Further, it should be understood, although it may have the same effect on the light signal, that the optical path length may be changed to cause a negative phase change between 0-(-$2\pi$ radians) or between -$\pi$-$\pi$ radians.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. Further, the use of terms "first", "second", and "third", and the like, herein do not denote any order, quantity, or importance, but rather are used to distinguish one element from another. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description, with reference to the appended drawings.

DETAILED DESCRIPTION

Figure 1:
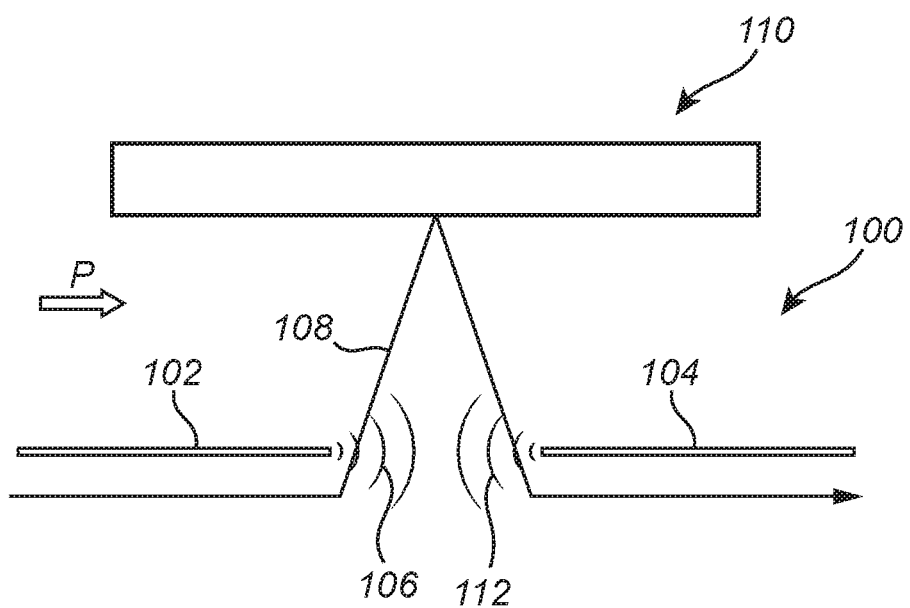
FIG. 1 schematically illustrates an integrated photonic device.

FIG. 1 illustrates an integrated photonic device 100 comprising an input waveguide 102 extending in an input plane and an output waveguide 104 extending in an output plane. Here, the input and output planes coincide, such that the output plane could be said to be contained within the input plane.

An input coupler 106 is optically coupled to the input waveguide 102, wherein the input coupler 106 is configured to redirect a light signal 108 out of the input waveguide 102 and the input plane. It should be noted that the light signal 108 is here illustrated as a well-defined line for the sake of clarity. In reality, the light signal 108 may have a different distribution. Further, the light signal 108 here propagates in the propagation direction P.

A light property modifier 110 is configured to receive the light signal 108 from the input coupler 106 and reflect the light signal 108 towards the output plane. The light property modifier 110 is configured to selectively adjust an optical path length of the light signal 108. Adjusting of the optical path length of a light signal will be further described below in conjunction with FIG. 2a-2b.

An output coupler 112 is optically coupled to the output waveguide 104, wherein the output coupler 112 is configured to receive the reflected light signal 108 from the light property modifier 110 and redirect the light signal 108 into the output waveguide 104 and the output plane.

The input waveguide 102 and the output waveguide 104 may be formed on a semiconductor substrate and may be formed through CMOS processing. Thus, the integrated photonic device 100 may be compact and may allow small size waveguides. Further, a plurality of different waveguides may be formed on a common substrate.

The light property modifier 110 may be arranged above the input plane and the output plane so as to receive the light signal 108 from the input coupler 106 and redirect the light signal 108 to the output coupler 112. The light property modifier 110 may be arranged on, and integrated with, the substrate so as to ensure that the light property modifier 110 is arranged to properly receive and redirect the light signal 108.

The light property modifier 110 may in another embodiment be arranged on the substrate between the substrate and the input plane and the output plane.

The input coupler 106 and the output coupler 112 may be formed as grating couplers. This implies that a periodic structure may be formed in a plane of the waveguide that may affect an incoming light wave to be scattered. A constructive interference of the light wave may be formed in a desired direction so that a redirection of the light signal 108 may be controlled.

In another embodiment, the input coupler 106 and the output coupler 112 may be formed as reflective structures, e.g. from a reflective material for redirecting a light signal 108 to a desired direction.

It should be realized that one of the input coupler 106 and the output coupler 112 may be formed as a grating coupler and the other may be formed as a reflective structure.

The use of grating couplers may be advantageous, especially in the output coupler 112, as the grating coupler may allow a light signal 108 to be received over a relatively large area and still be correctly coupled to the waveguide.

Figure 2A:
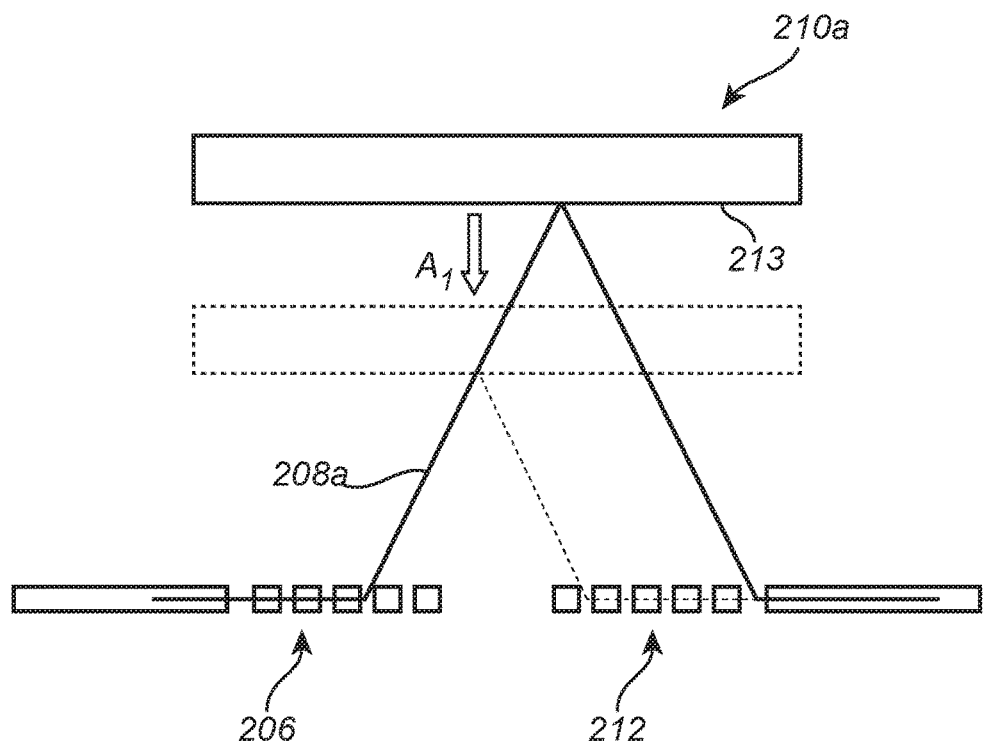
FIG. 2a schematically illustrates an embodiment of a light property modifier.

Referring now to FIG. 2a, an embodiment of a light property modifier 210a configured to selectively adjust the optical path length of a light signal 208a is illustrated. The light property modifier 210a may comprise a reflector 213 movable along an axis A1 being substantially perpendicular to the input plane in order to selectively adjust the optical path length of the light signal 208a. For example, by moving the reflector 213 closer to the input and/or output coupler 206, 212, the optical path length of the light signal 208a may be decreased. Similarly, by moving the reflector 213 further away from the input and/or output coupler 206, 212, the optical path length of the light signal 208a may be increased.

The reflector 213 may be arranged on a carrier 214, which is movable. Alternatively, a movable structure may be formed from a reflective material so as to implement the movable reflector 213.

The carrier 214 may be connected to an actuator (not shown) for controlling movement of the carrier 214 so that the actuator may control a position of the reflector 213 in relation to the input and/or output coupler 206, 212 and, hence, the optical path length of the light signal 208a.

In an embodiment, the carrier 214 may be formed as a membrane, which may be supported in positions on opposite sides in relation to the input coupler 206 and the output coupler 212 so that the membrane is arranged over the input coupler 206 and the output coupler 212 to properly receive and redirect the light signal 208a.

In another embodiment, the carrier 214 may be formed as a cantilever structure, supported on one side in relation to the input coupler 206 or the output coupler 212 and extending to be arranged over the input coupler 206 and the output coupler 212 to properly receive and redirect the light signal 208a.

The membrane or the cantilever structure may be connected to a microelectromechanical system (MEMS), which may control a movement of the membrane or the cantilever structure, e.g. by controlling a material strain so as to control a flexing of the membrane or the cantilever structure and hence control a position of the reflector 213 in relation to the input coupler 206 and the output coupler 212.

Figure 2B:
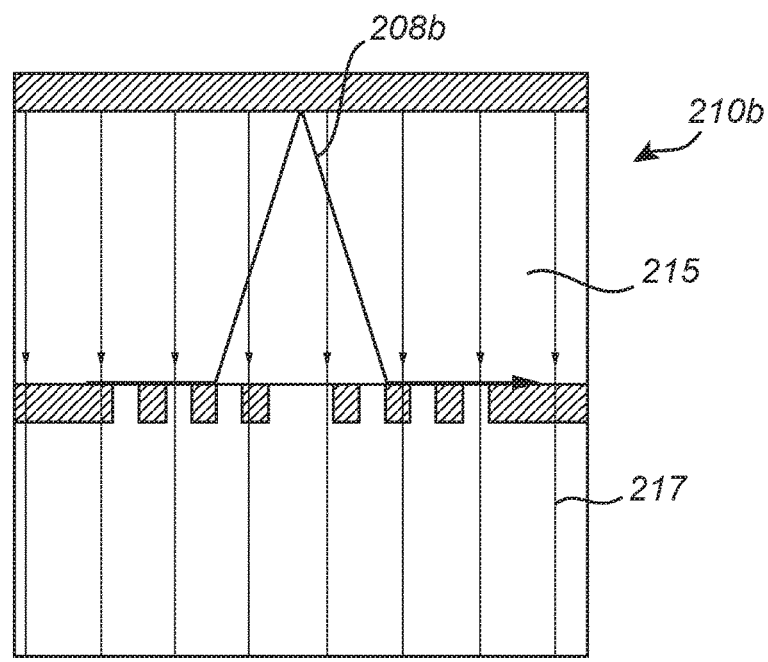
FIG. 2b schematically illustrates an embodiment of a light property modifier.

Referring now to FIG. 2b, an embodiment of a light property modifier 210b configured to selectively adjust the optical path length of a light signal 208b is illustrated. The light property modifier 210b may comprise a material 215 having a refractive index affectable by an electromagnetic field 217 in order to selectively adjust the optical path length of the light signal 208b. It is to be understood that the term 'affectable' implies that a refractive index of the material may be selectively adjusted by an electromagnetic field. Such an electromagnetic field may be applied by an external electromagnetic field generator. Further, as is readily understood by the person skilled in the art, different directions and distributions of the electromagnetic field are possible within the scope of the inventive concept.

A combination of the light property modifiers described in conjunction with FIGS. 2a and 2b is possible within the scope of the inventive concept. In other words, the light property modifier may comprise a reflector movable along an axis A1 being substantially perpendicular to the input plane, and a material having a refractive index affectable by an electromagnetic field, in order to selectively adjust the optical path length of the light signal.

As is readily understood by the person skilled in the art, a location in the output plane wherein the light signal interacts with the output coupler may be altered when selectively adjusting the optical path length of the light signal. In some applications, this effect may be exploited in order to selectively direct the light signal into a selection of output waveguides having corresponding output couplers being spatially separated. Further, as is readily understood by the person skilled in the art, the desired result may be achieved by selecting e.g. the appropriate location and/or size of the input and/or output coupler, and/or the appropriate type of light property modifier, and/or the appropriate type of input and/or output coupler.

The light property modifier may be manufactured on a first wafer separate from a second wafer comprising the input waveguide arrangement, output waveguide arrangement, and input and output coupler. The first wafer comprising the light property modifier may subsequently be bonded to the second wafer, thus forming the integrated photonic device. This may provide an arrangement which is packaged during manufacturing.

Figure 3A:
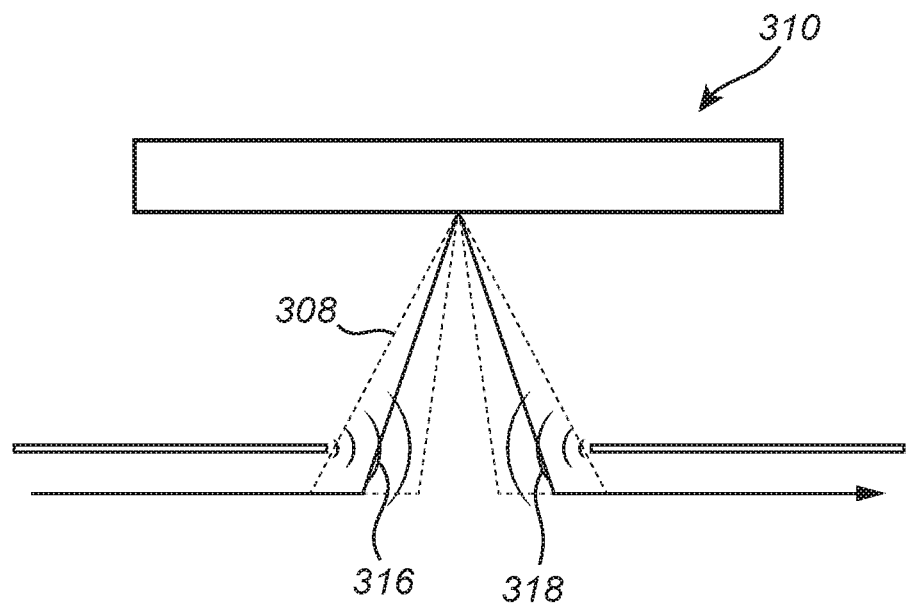
FIG. 3a schematically illustrates converging grating couplers.
Figure 3B:
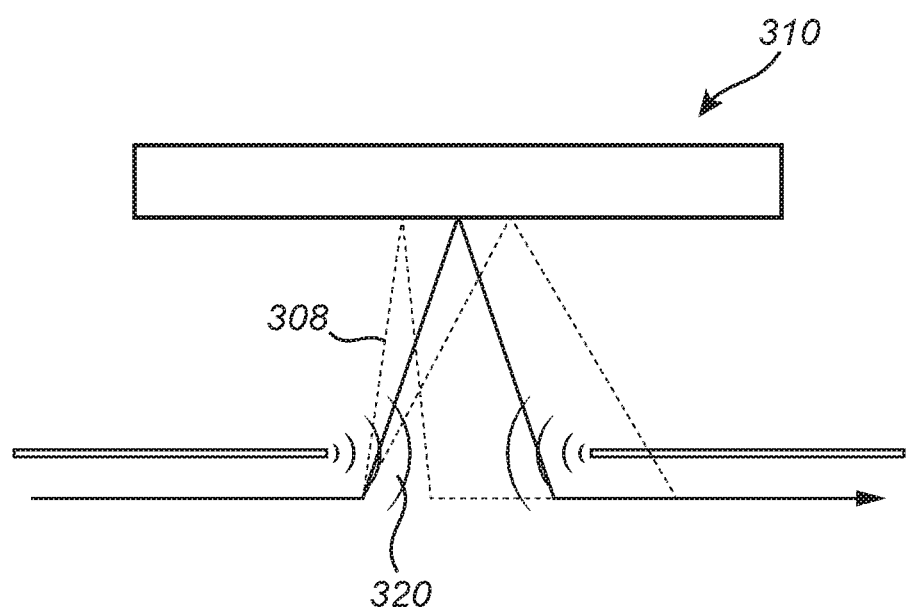
FIG. 3b schematically illustrates diverging grating couplers.

Referring now to FIG. 3a-3b, some embodiments of input and output couplers are illustrated.

In FIG. 3a, a converging grating input coupler 316 and a converging grating output coupler 318 is shown. The converging grating input coupler 318 converges the light signal 308 onto the light property modifier 310. Analogously, the converging grating output coupler 318 converges the reflected light signal 308 into the output waveguide to which the light signal 308 is optically coupled. Converging grating input coupler 316 and converging grating output coupler 318 may advantageously be used for efficient in-coupling and out-coupling of the light signal 308.

In FIG. 3b, a diverging grating input coupler 320 is shown. The diverging grating input coupler 320 diverges the light signal 308 onto the light property modifier 310.

Figure 4A:
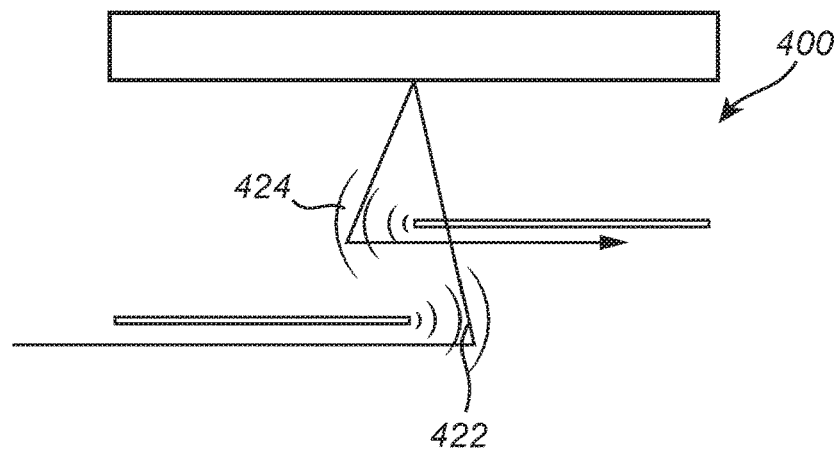
FIG. 4a schematically illustrates a side view of an integrated photonic device.
Figure 4B:
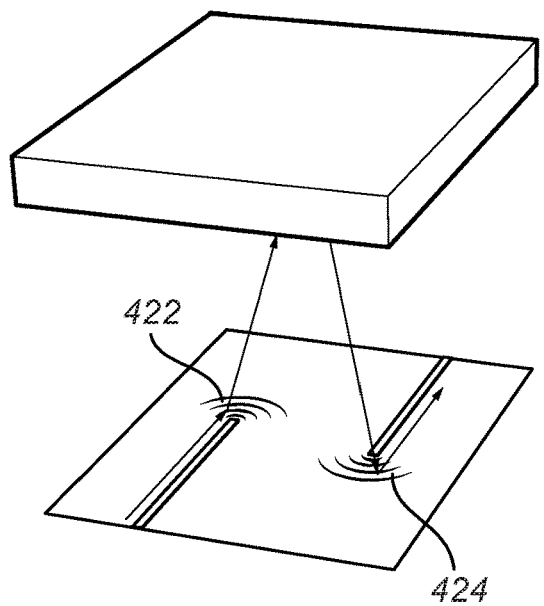
FIG. 4b schematically illustrates a perspective view of an integrated photonic device.

Referring now to FIG. 4a, an embodiment of an integrated photonic device 400 is illustrated. Here, a backward scattering grating input coupler 422 and a backward scattering grating output coupler 424 are shown. Such an arrangement may allow the respective couplers 422, 424 to be arranged in a manner having a low surface footprint. As can be seen in FIG. 4b, the backward scattering grating input coupler 422 and backward scattering grating output coupler 424 are coupled partly sideways.

Figure 5:
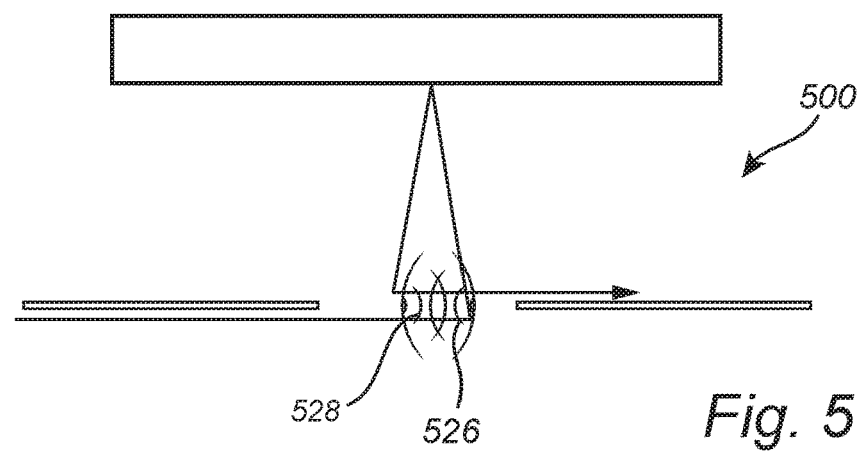
FIG. 5 schematically illustrates an embodiment of an integrated photonic device.

Referring now to FIG. 5, an embodiment of an integrated photonic device 500 is illustrated. Here, two backward scattering grating couplers are combined such that the input coupler 526 and output coupler 528 occupy substantially the same surface area. This may provide for an efficient arrangement with respect to surface footprint.

Figure 6A:
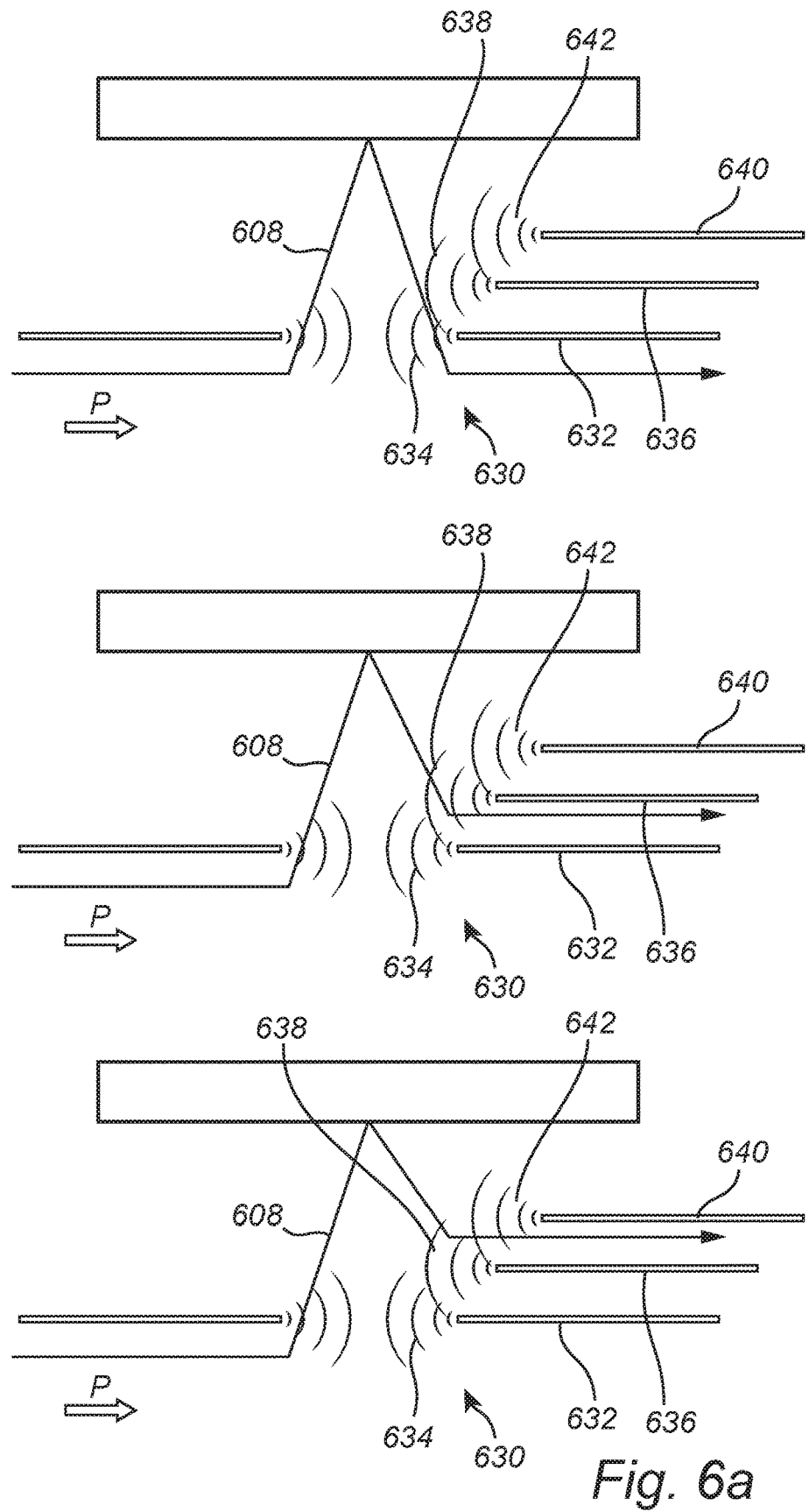
FIG. 6a schematically illustrates a side view of an output waveguide arrangement comprising several output waveguides.
Figure 6B:
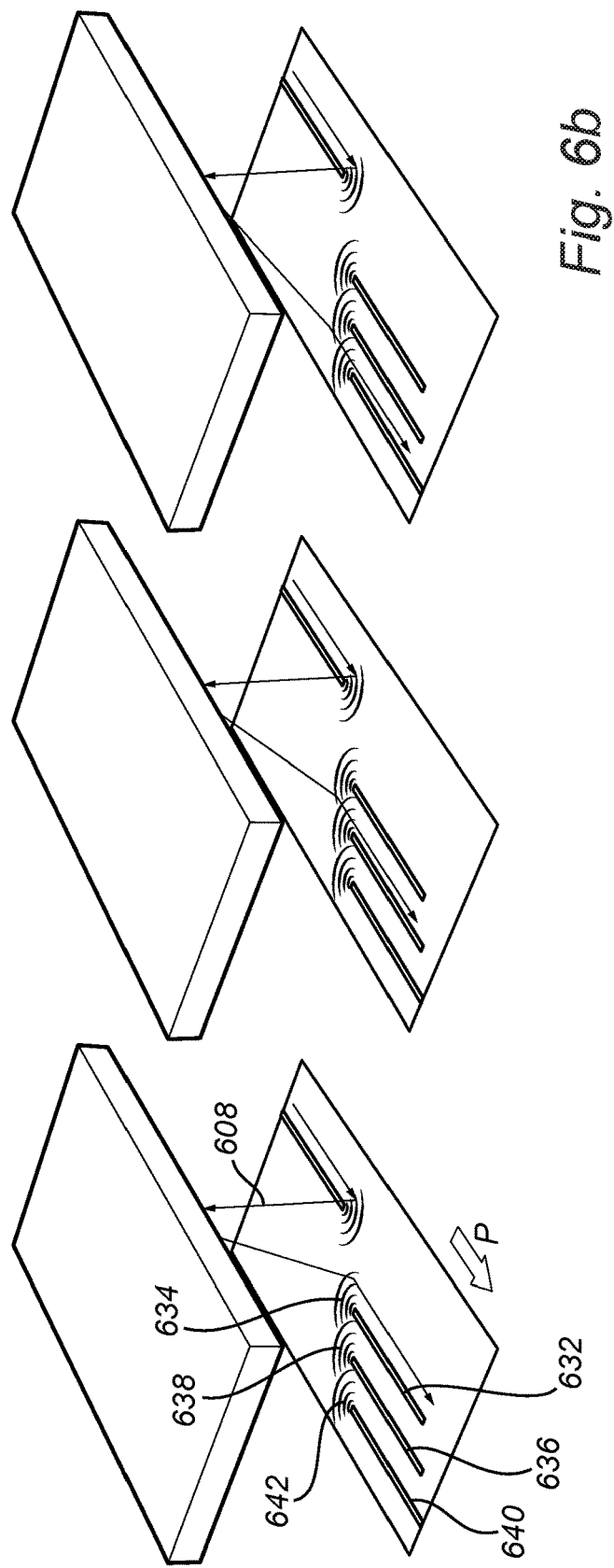
FIG. 6b schematically illustrates a perspective view of an output waveguide arrangement comprising several output waveguides.

Referring now to FIG. 6a, an output waveguide arrangement 630 comprising several output waveguides is illustrated in a side view. Here, the output waveguide arrangement 630 comprises a first output waveguide 632 optically coupled to a first output coupler 634, a second output waveguide 636 optically coupled to a second output coupler 638, and a third output waveguide 640 optically coupled to a third output coupler 642. By selectively adjusting a path length of the light signal 608, the light signal 608 may be selectively directed into either of the output couplers 634, 638, 642. As can be seen in FIG. 6b, the input coupler 646 is configured to redirect the light signal 608 sideways. Consequently, the output waveguides 632, 636, 640 and their corresponding output couplers 634, 638, 642 may be spatially separated in the output plane. In particular, the output waveguides 632, 636, 640 and their corresponding output couplers 634, 638, 642 may be distributed spatially in a direction being substantially perpendicular to a propagation direction P in the input waveguide 644.

Although not shown in FIGS. 6a-6b, the output couplers may be arranged on a common line in the output plane. The selective adjustment of the path length of the light signal may determine a position along the common line in which the light signal is received. Hence, it is possible to select the output waveguide that receives the light signal.

The output waveguides may form turns in the output plane so as to redirect the light signal once received by the output coupler. Thus, an output waveguide will not interfere with the output coupler of another output waveguide.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. An integrated photonic device comprising:
   an input waveguide arrangement comprising an input waveguide configured to extend in an input plane, and an output waveguide arrangement comprising an output waveguide configured to extend in an output plane, wherein the output plane is parallel to or contained within the input plane;
   an input coupler optically coupled to the input waveguide, wherein the input coupler is configured to redirect a light signal out of the input waveguide and the input plane;
   a light property modifier configured to receive the light signal from the input coupler and reflect the light signal towards the output plane; and
   an output coupler optically coupled to the output waveguide, wherein the output coupler is configured to receive the reflected light signal from the light property modifier and redirect the light signal into the output waveguide and the output plane;
   wherein the light property modifier is configured to selectively adjust an optical path length of the light signal between the input coupler and the output coupler.

2. The integrated photonic device according to claim 1, wherein the input waveguide arrangement, the output waveguide arrangement, and the light property modifier are integrated on one and the same semiconductor substrate.

3. The integrated photonic device according to claim 1, wherein the light property modifier comprises a reflector configured to be movable along an axis being substantially perpendicular to the input plane in order to selectively adjust the optical path length of the light signal.

4. The integrated photonic device according to claim 3, wherein the reflector is selected from the group consisting of: metal reflectors, Bragg stack reflectors, flat lenses, and high contrast grating reflectors.

5. The integrated photonic device according to claim 3, further comprising an actuator configured to move the reflector in the direction substantially perpendicular to the input plane.

6. The integrated photonic device according to claim 5, wherein the actuator is selected from the group consisting of: capacitive actuators, piezoelectric actuators, magnetic actuators, and thermal actuators.

7. The integrated photonic device according to claim 5, wherein the actuator is a microelectromechanical system, MEMS, structure configured to be controlled by an applied voltage and to move the light property modifier in the direction substantially perpendicular to the first plane such that linear adjustment of the optical path length of the light signal in response to an applied actuation signal is achieved.

8. The integrated photonic device according to claim 7, wherein the MEMS structure comprises a cantilever and/or a membrane.

9. The integrated photonic device according to claim 1, wherein the light property modifier comprises a material having a refractive index affectable by an external signal in order to selectively adjust the optical path length of the light signal.

10. The integrated photonic device according to claim 1, wherein the input coupler is a backward scattering grating coupler and the output coupler is a backward scattering grating coupler.

11. The integrated photonic device according to claim 1, wherein the input coupler is a backward scattering grating coupler and the output coupler is a forward scattering grating coupler.

12. The integrated photonic device according to claim 1, wherein the input coupler is a forward scattering grating coupler and the output coupler is a forward scattering grating coupler.

13. The integrated photonic device according to claim 1, wherein the input and output waveguide arrangements comprises silicon nitride, SiN.

14. The integrated photonic device according to claim 1, wherein the light signal comprises visible light.

15. An integrated photonic device comprising:
an input waveguide arrangement comprising an input waveguide configured to extend in an input plane, and an output waveguide arrangement comprising an output waveguide configured to extend in an output plane, wherein the output plane is parallel to or contained within the input plane;
an input coupler optically coupled to the input waveguide, wherein the input coupler is configured to redirect a light signal out of the input waveguide and the input plane;
a light property modifier configured to receive the light signal from the input coupler and reflect the light signal towards the output plane, wherein the light property modifier is configured to selectively adjust an optical path length of the light signal; and
an output coupler optically coupled to the output waveguide, wherein the output coupler is configured to receive the reflected light signal from the light property modifier and redirect the light signal into the output waveguide and the output plane, wherein the light property modifier comprises a material having a refractive index affectable by an external signal in order to selectively adjust the optical path length of the light signal.

16. An integrated photonic device comprising:
an input waveguide arrangement comprising an input waveguide configured to extend in an input plane, and an output waveguide arrangement comprising an output waveguide configured to extend in an output plane, wherein the output plane is parallel to or contained within the input plane;
an input coupler optically coupled to the input waveguide, wherein the input coupler is configured to redirect a light signal out of the input waveguide and the input plane;
a light property modifier configured to receive the light signal from the input coupler and reflect the light signal towards the output plane, wherein the light property modifier is configured to selectively adjust an optical path length of the light signal; and
an output coupler optically coupled to the output waveguide, wherein the output coupler is configured to receive the reflected light signal from the light property modifier and redirect the light signal into the output waveguide and the output plane, wherein the input coupler is a backward scattering grating coupler and the output coupler is a backward scattering grating coupler; or wherein the input coupler is a backward scattering grating coupler and the output coupler is a forward scattering grating coupler or wherein the input coupler is a forward scattering grating coupler and the output coupler is a forward scattering grating coupler.

* * * * *